US 6,615,150 B1

(12) United States Patent
Nelson et al.

(10) Patent No.: US 6,615,150 B1
(45) Date of Patent: Sep. 2, 2003

(54) METHOD FOR DETECTING ERRORS IN LOADING A LENTICULAR MATERIAL ON A PRINTER

(75) Inventors: David J. Nelson, Rochester, NY (US); Andrea S. Rivers, Bloomfield, NY (US); Philip F. Marino, Rochester, NY (US)

(73) Assignee: Eastman Kodak Company, Rochester, NY (US)

( * ) Notice: Subject to any disclaimer, the term of this patent is extended or adjusted under 35 U.S.C. 154(b) by 71 days.

(21) Appl. No.: 09/784,743

(22) Filed: Feb. 15, 2001

(51) Int. Cl.⁷ .................. G01D 18/00; G01D 21/00
(52) U.S. Cl. ........................... 702/85; 271/3.14
(58) Field of Search .................. 702/45, 1, 85, 702/94, 98; 271/3.01, 3.02, 3.13, 3.14, 3.15, 227, 226, 3.17, 10.12, 8.1, 275, 276, 196; 700/223

(56) References Cited

U.S. PATENT DOCUMENTS

| | | | | |
|---|---|---|---|---|
| 4,269,401 A | * | 5/1981 | Sargis et al. | 270/58.8 |
| 4,397,459 A | * | 8/1983 | Silverberg et al. | 271/94 |
| 5,048,813 A | * | 9/1991 | Wierzewski et al. | 271/98 |
| 5,076,559 A | * | 12/1991 | Lawniczak | 271/3.11 |
| 5,255,905 A | * | 10/1993 | Reid et al. | 271/94 |
| 5,356,127 A | * | 10/1994 | Moore et al. | 271/11 |
| 5,414,491 A | | 5/1995 | Bryant | |
| 5,454,556 A | * | 10/1995 | Siegel | 271/98 |
| 5,582,104 A | * | 12/1996 | Best et al. | 101/126 |
| 5,673,100 A | | 9/1997 | Morton | |
| 5,786,902 A | * | 7/1998 | Morton | 358/475 |
| 5,812,152 A | * | 9/1998 | Torigoe et al. | 347/2 |
| 5,822,038 A | * | 10/1998 | Slater et al. | 355/22 |
| 5,921,544 A | * | 7/1999 | Benedict | 271/226 |
| 5,927,704 A | * | 7/1999 | Quackenbush et al. | 271/98 |
| 5,988,629 A | * | 11/1999 | Burlew et al. | 271/152 |
| 6,015,146 A | * | 1/2000 | Siegel | 271/98 |
| 6,078,424 A | | 6/2000 | Morton | |
| 6,086,064 A | * | 7/2000 | Biegelsen et al. | 271/258.01 |
| 6,087,054 A | | 7/2000 | Cobb et al. | |
| 6,220,693 B1 | * | 4/2001 | Bode et al. | 347/34 |
| 6,234,472 B1 | * | 5/2001 | Juan | 271/194 |
| 6,334,881 B1 | * | 1/2002 | Giannetta et al. | 55/486 |
| 6,367,999 B1 | * | 4/2002 | Juan et al. | 400/645 |
| 6,386,536 B1 | * | 5/2002 | Juan | 271/276 |
| 6,386,671 B1 | * | 5/2002 | Huston et al. | 347/16 |

* cited by examiner

Primary Examiner—Michael Nghiem
Assistant Examiner—Demetrius Pretlow
(74) Attorney, Agent, or Firm—Nelson Adrian Blish (57) ABSTRACT

A method for detecting errors in loading a lenticular material (10) on a printer (60) comprises loading the lenticular material (10) on a vacuum platen (20) and drawing a vacuum on the vacuum platen (20). An airflow is measured on the vacuum platen (20) and compared to a predetermined value.

13 Claims, 7 Drawing Sheets

METHOD FOR DETECTING ERRORS IN LOADING A LENTICULAR MATERIAL ON A PRINTER

FIELD OF THE INVENTION

This invention relates in general to detecting errors in orientation of media to be printed and in particular to detecting alignment errors in lenticular material prior to printing.

BACKGROUND OF THE INVENTION

When a sheet fed printer is loaded with media having different surface characteristics on both sides, such as lenticular media, there are many opportunities for error in terms of flipping the media the wrong way up before it is printed. Other errors include curling, buckling, skewed, misaligned, and missized sheets. The printing of quality images requires correct orientation of the media in the printer.

The slitting, cutting, packaging, and printer loading operations may be manual operations that take place in the dark and it is not trivial to verify that the media is loaded the correct way up in the printer. As the printing operation occurs unattended in the dark, particularly for photosensitive material, an error might not be noticed until the media is developed. If an entire stack of media is printed upside down, there is potential for significant economic loss.

U.S. Pat. No. 5,414,491, Vacuum Holder for Sheet Materials, shows a method of determining different sheet sizes based on changes in vacuum flow. This patent, however, does not provide a method and apparatus for distinguishing misalignments of sheets or other problems described above.

It is therefore desirable to provide a means for detecting errors in loading lenticular material on printers.

SUMMARY OF THE INVENTION

Briefly, according to one aspect of the present invention, a method for detecting errors in loading a lenticular material on a printer comprises loading the lenticular material on a vacuum platen and drawing a vacuum on the vacuum platen. An airflow is measured on the vacuum platen and compared to a predetermined value.

The lenticular media, which is used as an illustrative example, has a photographic emulsion on one side of a support and lenticular lenses on the other. When placed on a vacuum platen, the amount of flow in the vacuum lines can be used as an indication of errors in loading. A nominal "correct" value is stored to be used as a reference from which to make decisions. This nominal value is stored during initial system setup, when media is placed correctly on the vacuum platen and the source of the system vacuum is in a known state. After storing this nominal value, two possible classes of errors can be differentially distinguished; an error in placement or seating (not all of the vacuum holes in the platen covered with media), or an error in media loading (the media is loaded with the emulsion down rather than the lenticals down). In other words, if the media is loaded with the emulsion on the platen, it's smooth surface mates better with the vacuum platen and does not allow any appreciable flow in the vacuum lines. This results in a value for the flow that is less than the nominal value. If, however, the media is loaded correctly with the lenticules facing the platen, a small amount of flow in the vacuum lines is present due to leakage along the clefts of the lenticals, which can be measured and compared to the nominal value to verify that the media is placed on the platen properly. If the media has either not been seated properly on the platen, or is skewed, some of the vacuum holes will be left open resulting in a greater than nominal flow measurement which can be detected.

In addition, this kind of sensing could identify other major errors such as the wrong media size or type. The following table provides a summary of the sensing states:

TABLE 1

No (or very little flow): Media loaded upside down (error)

Moderate flow: Media loaded correctly

High flow: Media not seated on platen properly, media skewed, or wrong media size (error)

Setting the thresholds between these states in the software controlling the printer depends on the vacuum system used, the lenticular dimensions, the platen hole pattern, the sensor used to detect flow, and the electronics used to condition the raw sensor signal. A low pass filter is used in the implementation to reduce the effects of higher frequency signal noise that is prevalent in such signals, due to sensor characteristics as well as pneumatic system noise. A low pass filter can be implemented in hardware or firmware, such as a moving average signal processing technique.

Measuring flow is preferred over a simple vacuum pressure measurement due to the S/N ratio achievable. If pressure in the lines were measured, only a small change in signal would be noted, because the vacuum source can maintain the same nominal pressure in the lines regardless of flow. However, the amount of leakage in the platen, and therefore flow in the vacuum lines will produce a significant signal change from the appropriate flow sensor and so, can be used as a reliable sensing method.

Various commercially available instruments can be used to measure flow. The Pitot tube is a common method in which the flow is converted to a static stagnation pressure that can be easily measured. This is the method that has been demonstrated. In this configuration, there is still a relatively small pressure developed by the flow, on the order of 5 inches of water, (125 mm Hg).

As alternatives to the preferred Pitot tube embodiment, a traditional anemometer could also be used to measure the flow rate. Alternatively "hot wire" anemometers are available.

BRIEF DESCRIPTION OF THE DRAWINGS

The above-mentioned and other features and objects of this invention and the manner of attaining them will become more apparent and the invention itself will be better understood by reference to the following description taken in conjunction with the accompanying figures wherein.

DETAILED DESCRIPTION OF THE INVENTION

The invention has been described in detail with particular reference to certain preferred embodiments thereof, but it will be understood that variations and modifications can be effected within the scope of the invention.

Figure 1:
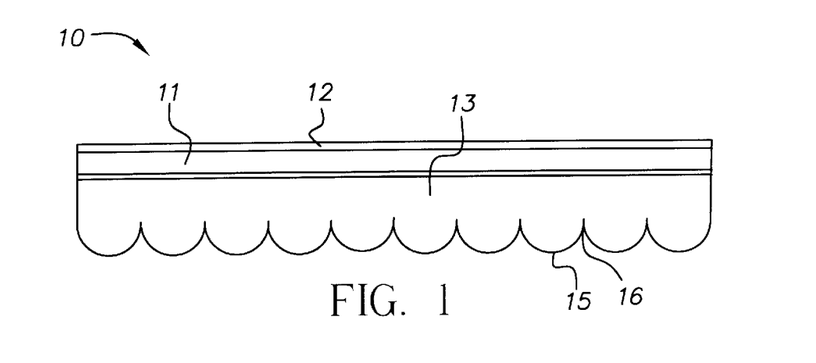
FIG. 1 shows a side view of a sheet of lenticular material.

Referring now to FIG. 1, a form of lenticular media 10 comprises a clear support 11, a photographic emulsion 12, and lenticular lenses 13. The scale of the lenses on FIG. 1 is to be used for reference only. The lenticular lenses are shown to have two regions, the apex 15 and cleft 16. Currently utilized sheets of lenticular media have 20 or more lenticals per inch. It is also recognized that many kinds of printing can be used requiring various types of media. For example, for many printing techniques, there would be no photographic emulsion. The specific type of media is not critical to the invention, providing that one side has a different surface characteristic than the other.

Figure 2:
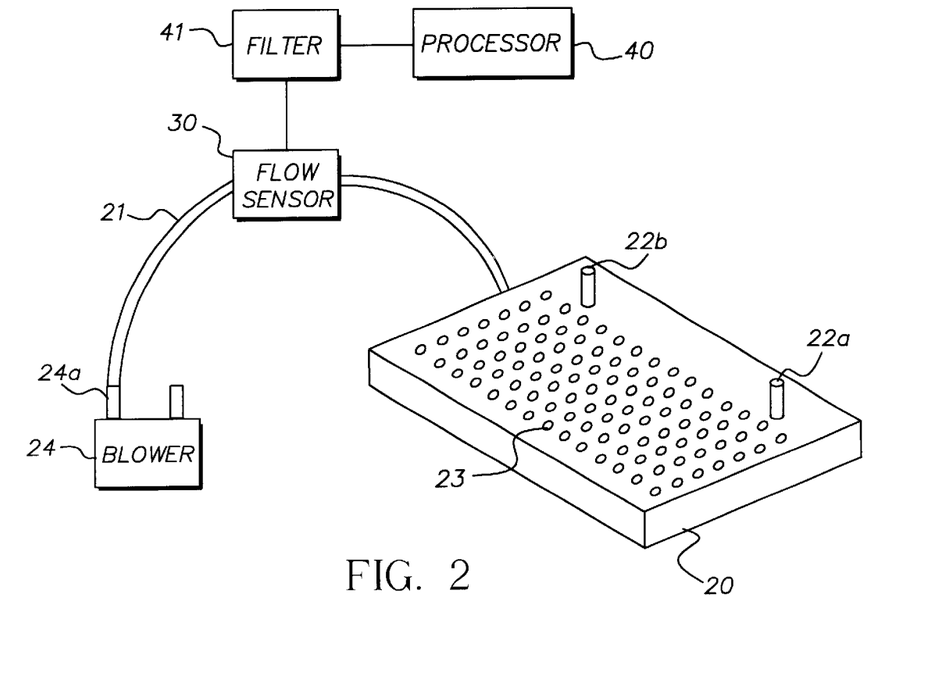
FIG. 2 is a diagrammatical view of the preferred embodiment of the apparatus.

Referring now to FIG. 2, a vacuum platen 20 is shown with vacuum holes 23 connected through a plenum (not shown) to the input side 24a of a blower 24 through a vacuum line 21. Also shown on the platen, are alignment pins 22a and 22b that are used as positional references for the registration of sheets of lenticular media. When a sheet of the previously described media is placed with the lenticular lenses 13 face down on a vacuum platen 20, air leaks through the vacuum holes 23 into the vacuum line 21 through the several small channels created by the clefts 16 of the lenticals 10 and the surface of said platen. This leakage can be measured by a flow sensor 30, which can be, but is not restricted to any of the following sensors commonly known in the art: Pitot tube with associated pressure sensor, anemometers, hot-wire anemometers which measure flow based on the convective cooling effect that it has on a wire with electrically induced heating, Venturi, or orifice meters. All of these sensors convert the flow of air into a more easily measurable quantity.

Figure 10:
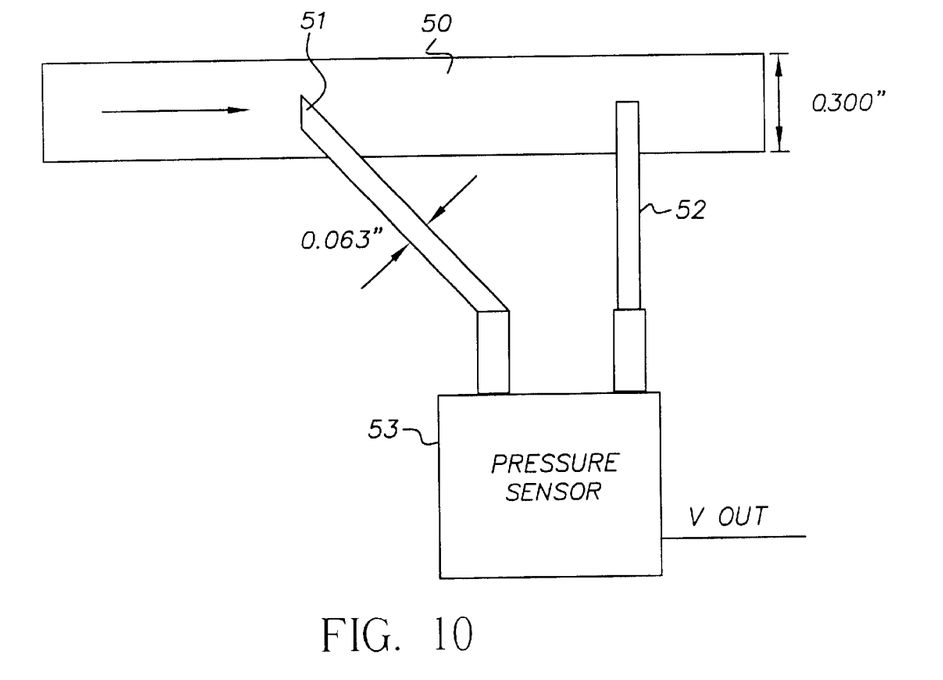
FIG. 10 is a diagram of a specific embodiment of a flow sensor, specifically, a Pitot tube with pressure detector.

For example, the Pitot tube 50 shown in FIG. 10 measures flow indirectly by taking a reading of the stagnation pressure with the in-flow stagnation pressure tap 51. This pressure level is sensed by the pressure sensor 53 differentially, using the static pressure tap 52, which due to its geometry is not in the flow, as a baseline. The pressure sensor converts the pressure difference to an output voltage which is acted upon by the filtration circuitry 41. For the amount of flow which was experienced in the experiments performed, and the geometry shown in FIG. 10, an appropriate flow sensor is Model DCAL405GN low pressure sensor from Data Instruments. It is recognized that the pitch and shape of the lenticals as well as the amount of vacuum supplied will also effect sensor selection.

Figure 11:
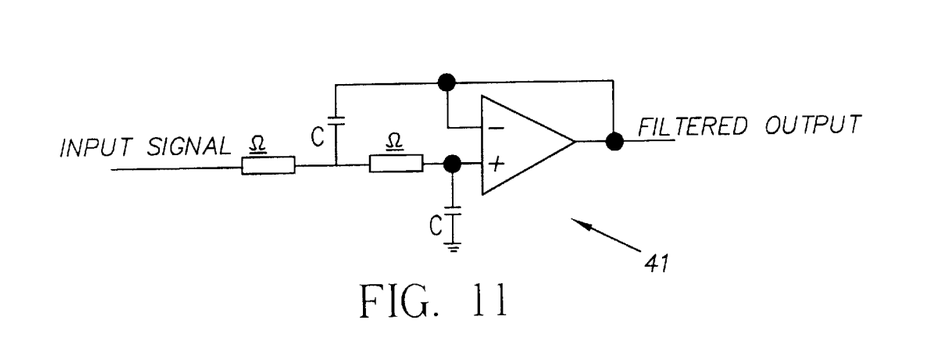
FIG. 11 is a schematic diagram of a circuit used to condition the signal from the flow sensor.

Referring back to FIG. 2, the flow sensor 30 provides a voltage output to the filtration circuitry 41. FIG. 2 shows a simplified vacuum system. Not shown are valves controlling the vacuum and other elements which tend to disturb the system and create transient flow levels in the vacuum lines 21. The effects of these transient flow level changes and high frequency electrical noise in the pressure sensor 30 are minimized through the use of the low pass filter 41. The preferred circuitry is a second order Butterworth low pass filter as shown in FIG. 11 Any of a variety of low pass filters would be suitable for this application, thus the invention is not restricted to the type of filtration. The degree of necessary filtering would depend upon the sensor and pneumatic system in use.

Figure 12:
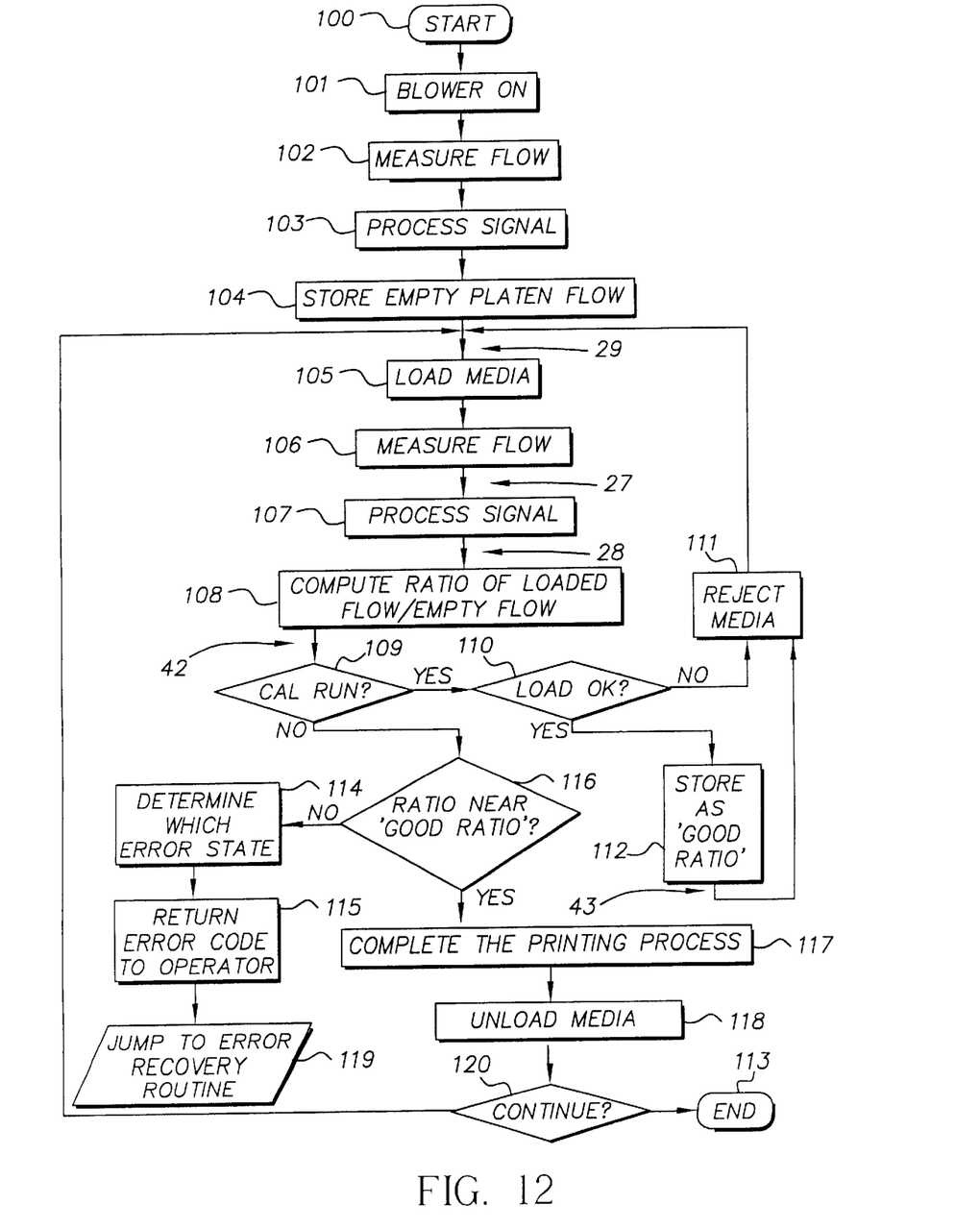
FIG. 12 is a flowchart describing the steps of the method.

FIG. 12 shows the method in flowchart form. The routine begins at step 100, and the blower 24 is turned on in step 101. The flow through the vacuum system with no media on the platen is measured at step 102. The signal is low pass filtered by the filtration circuitry 41 and then stored by the signal processor 40 as the Empty Platen Flow Value 29 in step 104. The system then loads media 10 onto the platen 20 in step 105. A flow measurement is made of the loaded platen flow value 27 in step 106 by the flow sensor 30. The output of the flow sensor 30 is sent to the low pass filtration circuitry 41 the signal is processed in step 107 to generate the filtered loaded platen flow value 28. The Signal Processor 40 generates the computed ratio 42 in step 108. This is the ratio between the filtered loaded platen flow value 28 and the Empty Platen Flow value 29 at step 109 the system checks whether a calibration is in process. If this is a calibration run, a visual verification that the media is loaded properly for the calibration is made in step 110. If the media is deemed to be loaded correctly, the signal processor stores the computed ratio 42 as the Good Ratio 43 in step 112, and the media is rejected in step 111. The process then begins again with loading of media 10 in step 105. If during a calibration procedure, the media is not found to be loaded correctly in step 110, the media is rejected and the system again attempts to load media at step 105. If there is already a stored Good Ratio 43 and a calibration is not required as determined in step 109, then the computed ratio 42 is compared to the Good Ratio 43 in step 116. A determination is then made by the signal processor 40 as to whether or not there has been an error in loading in step 116. If computed ratio 42 is not within a given range of the Good Ratio 43, then the media is not loaded properly. The signal processor 40 determines the type of loading error, which has occurred in step 114 and returns the appropriate error code to the operator in step 115. At this point the appropriate error recovery routine is executed in step 119. If the media was loaded properly, the cycle continues with the printing step 117. The media is unloaded in step 118 and the process repeats as required with step 120 and with a return to the load media step (105).

Figure 3:
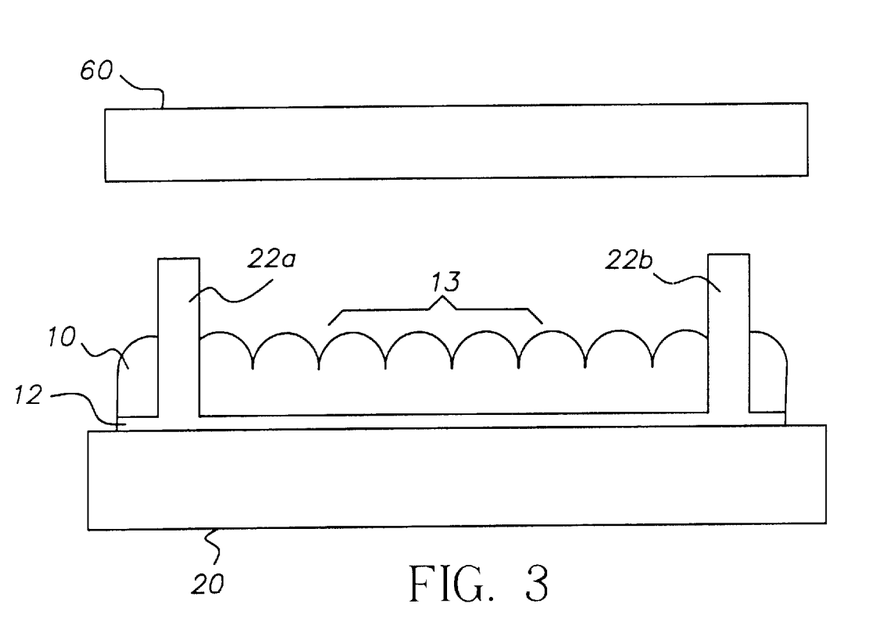
FIG. 3 shows a side view of the first media condition detectable by the invention: Media loaded upside-down.

FIGS. 3 through 9 show the various states that are detectable with the invention as described. FIG. 3 shows the lenticular media 10 properly loaded against the alignment pins 22a and 22b, but with the photographic emulsion 12 facing the vacuum platen 20, and the lenses facing the printer 60. As the printing would generally not occur on the side with the lenticals, this condition represents an error in loading. This state is recognizable by the fact that the smooth emulsion side seals well with the vacuum platen 20 and does not allow appreciable leakage in the vacuum line 21. This state of no (or very little) flow is registered by the pressure sensor 30, filtration circuitry 41 and signal processor 40 as an error state and an alarm is sounded or other appropriate action is taken.

Figure 4:
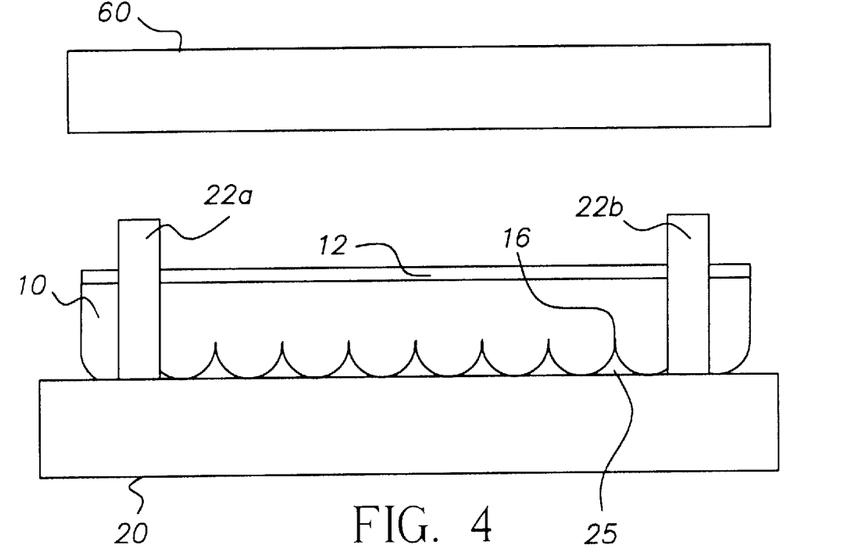
FIG. 4 shows a side view of the second media condition detectable by the invention: Media loaded correctly.
Figure 5:
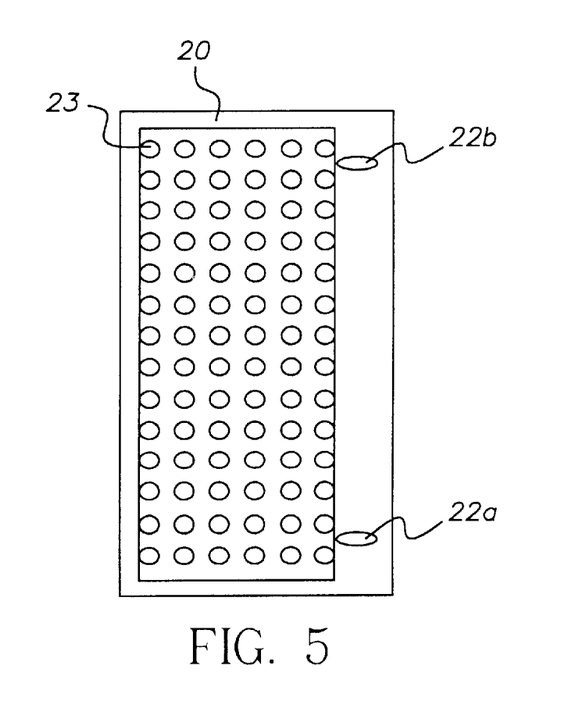
FIG. 5 shows a top view of the media properly and squarely loaded on the platen.

FIGS. 4 and 5 show a properly loaded sheet of lenticular media as viewed from the side. Unlike the state in FIG. 3, the media 10 in FIG. 4 is loaded up against the alignment pins 22a and 22b with the lenses facing the platen 20 and the photographic emulsion 12 facing the printer 60. FIG. 5 shows this same properly loaded sheet of lenticular media 10 as viewed from above. As the media is the proper size, all of the vacuum holes 23 are covered. This arrangement will result in a nominal flow created by air leaking into the vacuum line 21 along the length of the lenticals in the normal spaces 25 between them and the platen 20. This nominal flow is converted, via the previously described process (shown in FIG. 12), to a numeric value, the computed ratio 42. The computed ratio 42 is compared to the good ratio 43 by the signal processor 40 to determine that the media has been loaded correctly.

Figure 6:
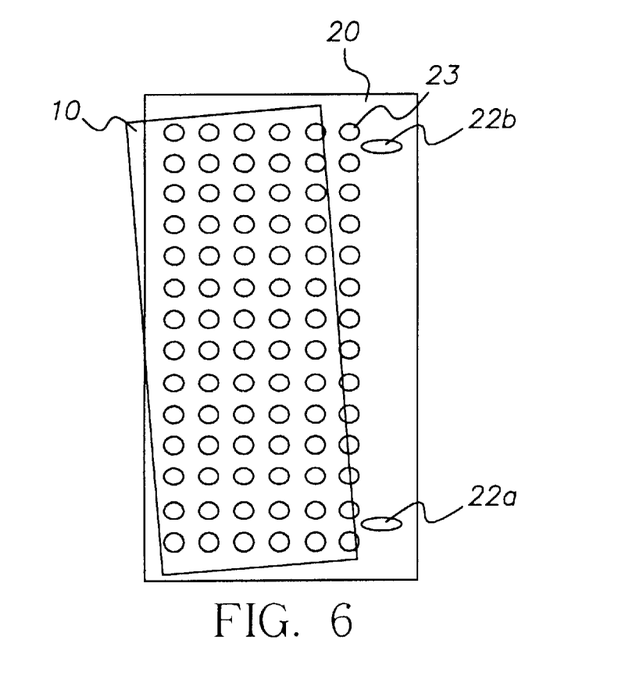
FIG. 6 shows a top view of a third media condition detectable by the invention: Media loaded at a skew angle.
Figure 7:
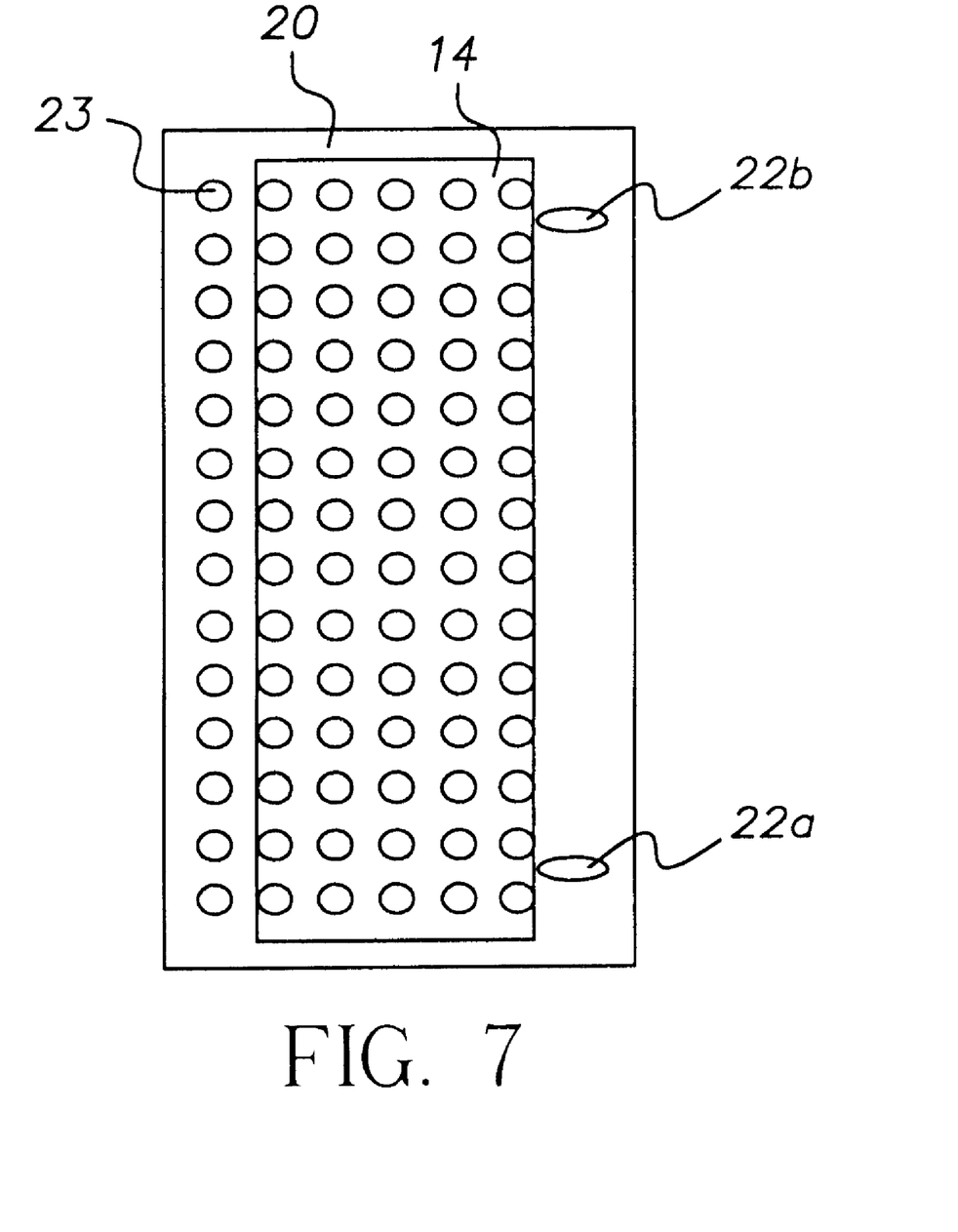
FIG. 7 shows a top view of a fourth media condition detectable by the invention: Incorrect size media loaded.

FIGS. 6 and 7 show two possible error states detectable by the invention. In FIG. 6, the lenticular media 10 is loaded such that is does not contact both alignment pins 22a and 22b. This skew angle to the platen results in not all of the vacuum holes 23 being covered by the lenticular media 10. A greater flow results from this state than the nominal flow created in the case shown in FIGS. 4 and 5, and similar actions should be taken as was the case in FIG. 3. In FIG. 7, an undersized sheet of lenticular media 14 has been loaded on the platen. Though the sheet is registered properly against the alignment pins 22a and 22b, it does not cover all of the vacuum holes 23 on the vacuum platen 20 resulting again in a greater than nominal flow in the vacuum line 21. Once again similar actions should be taken as was the case in FIG. 3.

Figure 8:
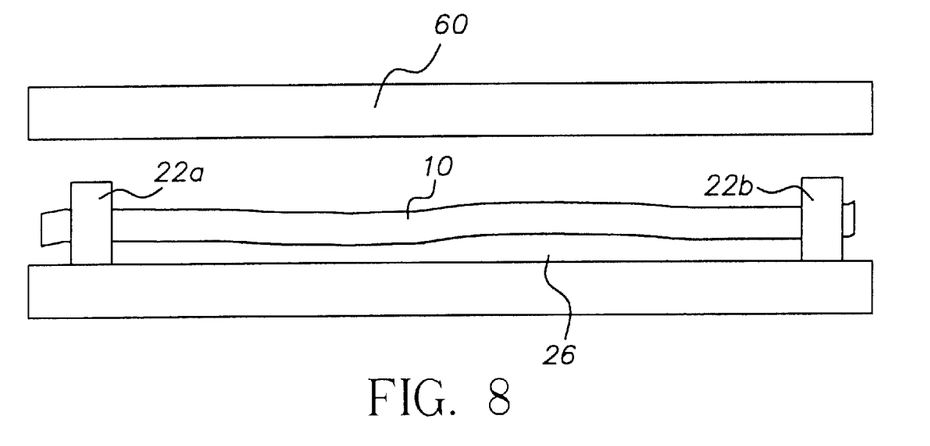
FIG. 8 shows a side view of a fifth media condition detectable by the invention: Media not seated on platen properly.
Figure 9:
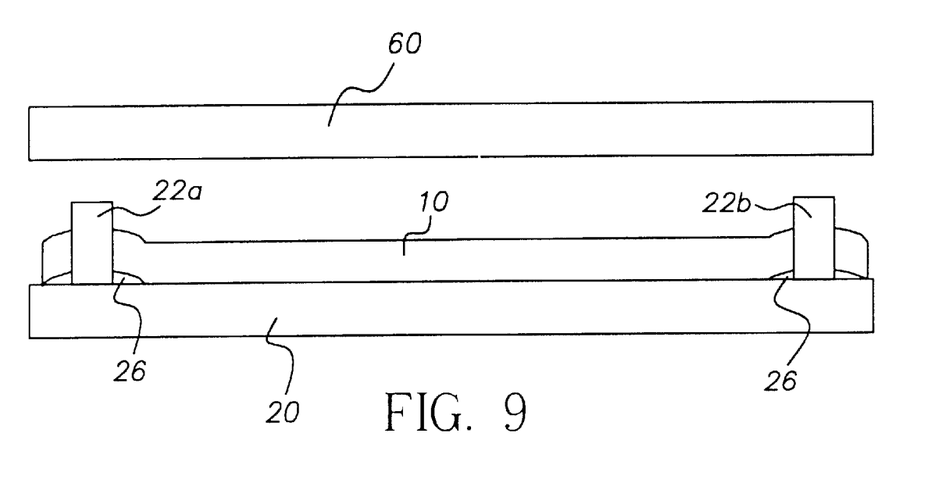
FIG. 9 shows a side view of a specific seating problem that is more likely to occur with this loading method: Media not seated locally in area of pins.

FIGS. 8 and 9 show another possible error state. Referring to FIG. 8, even if the lenticular media 10 is the correct size and is loaded properly against the alignment pins 22a and 22b, there is a possibility that it is not seated properly on the vacuum platen 20. In this case, an abnormal space 26 is created which is effectively added to the normal spaces 25 created by the lenticals previously discussed. As was the case in FIGS. 6 and 7, greater than nominal flow is experienced and an error state is recognized by the signal processor 40. FIG. 9 illustrates a likely occurrence of an abnormal space 26 which is the media buckling locally at the alignment pins 22a and 22b.

The errors shown in FIGS. 8 and 9 can occur, for example, if the media has a natural curl either towards or away from the lenticles. In such an instance, if the curl is severe, the vacuum to the platen may not be able to straighten the media resulting in the improper seating condition.

PARTS LIST

10. Lenticular media
11. Media support
12. Photographic emulsion
13. Lenses
14. Undersized sheet of media
15. Apex
16. Cleft
20. Vacuum platen
21. Vacuum line
22. Alignment pins
23. Vacuum holes
24. Blower
25. Normal space
26. Abnormal space
27. Loaded platen flow value
28. Filtered loaded platen flow value
29. Empty platen flow value
30. Flow sensor
40. Signal processor
41. Filtration circuitry
42. Computed ratio
43. Good ratio
50. Pitot tube
51. Stagnation pressure tap
52. Static pressure tap
53. Pressure sensor
54. Voltage out
55. Direction of air flow
60. Printer

What is claimed is:

1. A method for detecting errors in loading a lenticular material on a printer comprising the steps of:

loading a lenticular material on a vacuum platen;

drawing a vacuum on said vacuum platen;

measuring an airflow to said vacuum platen; and comparing said airflow to a predetermined value to detect upside down loading of said lenticular material.

2. A method as in claim 1 wherein a Pitot tube measures said airflow.

3. A method as in claim 1 wherein an anemometer measures said airflow.

4. A method as in claim 1 wherein a hot wire anemometer measures said airflow.

5. A method as in claim 1 comprising the additional step of:

filtering a signal representative of said airflow prior to comparing said airflow to said predetermined value.

6. A method as in claim 1 wherein a no flow reading indicates said lenticular material is loaded upside down.

7. A method as in claim 1 wherein said predetermined value is established by measuring said airflow without lenticular material loaded on said platen.

8. A method as in claim 1 wherein said predetermined value is established by measuring said airflow with said lenticular material correctly loaded on said platen.

9. A method as in claim 12 wherein said second predetermined value is established by measuring said airflow with said lenticular material loaded at a skew angle on said platen.

10. A method as in claim 12 wherein said second predetermined value is established by measuring said airflow with an under size piece of said lenticular material loaded on said platen.

11. A method as in claim 12 wherein said second predetermined value is established by measuring said airflow with said lenticular material buckled on said platen.

12. An apparatus for detecting errors in loading a lenticular material in a printer comprising:

a vacuum platen;

a blower for drawing a vacuum on said vacuum platen;

a device for measuring an airflow to said vacuum platen;

a signal processor for comparing said airflow to a set of predetermined values;

wherein if said airflow less than a first predetermined value said media is upside down;

if said airflow is between said first predetermined value and a second predetermined value said media is loaded correctly; and if said airflow is greater than said second predetermined value said media is loaded incorrectly.

13. A method for printing lenticular material comprising the steps of:
   a) loading said lenticular material on a vacuum platen;
   b) drawing a vacuum on said vacuum platen;
   c) measuring an airflow to said vacuum platen;
   d) comparing said airflow to a predetermined value;
   e) if said airflow is different from said predetermined value go to step a) and reload said media;
   f) if said airflow is the same as said predetermined value proceed to step g); and
   g) printing an image on a surface of said lenticular material.

* * * * *